United States Patent
Zhang et al.

(10) Patent No.: US 11,352,771 B2
(45) Date of Patent: Jun. 7, 2022

(54) FAUCET STRUCTURE

(71) Applicant: Xiamen Forbetter Sanitary Ware Co., Ltd., Fujian (CN)

(72) Inventors: Xingui Zhang, Xiamen (CN); Qiang Chen, Xiamen (CN); Mouyong Lin, Xiamen (CN); Xiliang Yan, Xiamen (CN); Yihui Chen, Xiamen (CN)

(73) Assignee: XIAMEN FORBETTER SANITARY WARE CO., LTD., Xiamen (CN)

( * ) Notice: Subject to any disclaimer, the term of this patent is extended or adjusted under 35 U.S.C. 154(b) by 6 days.

(21) Appl. No.: 17/010,833

(22) Filed: Sep. 3, 2020

(65) Prior Publication Data

US 2021/0198874 A1    Jul. 1, 2021

(30) Foreign Application Priority Data

Dec. 27, 2019 (CN) .......................... 201922426107.3

(51) Int. Cl.
*E03C 1/04* (2006.01)
*F16L 37/088* (2006.01)

(52) U.S. Cl.
CPC .......... *E03C 1/0403* (2013.01); *F16L 37/088* (2013.01)

(58) Field of Classification Search
CPC .. E03C 1/0403; E03C 1/0401; E03C 2201/50; F16L 37/088
See application file for complete search history.

(56) References Cited

U.S. PATENT DOCUMENTS

| | | | | |
|---|---|---|---|---|
| 7,044,506 B2 * | 5/2006 | Dong | .................... | F16L 37/098 285/319 |
| 8,240,716 B2 * | 8/2012 | Kerin | .................... | F16L 37/144 285/93 |
| 9,109,350 B2 * | 8/2015 | Zhu | .......................... | E03C 1/06 |
| 10,223,617 B1 * | 3/2019 | Mnih | ................. | G06K 9/00577 |
| 2009/0256348 A1 * | 10/2009 | Bors | ..................... | F16L 37/144 285/12 |
| 2010/0170577 A1 * | 7/2010 | Liu | ........................ | E03C 1/0403 137/315.01 |
| 2011/0073205 A1 * | 3/2011 | Marty | ................... | E03C 1/0404 137/801 |
| 2011/0094604 A1 * | 4/2011 | Thomas | .................... | F16K 3/04 137/454.5 |
| 2012/0018020 A1 * | 1/2012 | Moore | .................. | E03C 1/0403 137/798 |
| 2012/0228871 A1 * | 9/2012 | Li | .......................... | F16L 37/138 285/307 |
| 2015/0198259 A1 * | 7/2015 | Lin | .......................... | E03C 1/04 137/603 |
| 2020/0102724 A1 * | 4/2020 | Rosko | .................. | E03C 1/0403 |

\* cited by examiner

*Primary Examiner* — J C Jacyna
(74) *Attorney, Agent, or Firm* — Leong C. Lei

(57) ABSTRACT

A faucet structure includes a faucet spout, at least one valve body, at least one water inlet connecting pipe, and at least one first connecting member. A water outlet end of the valve body is in communication with the faucet spout. One end of the water inlet connecting pipe is hermetically connected to a water inlet end of the valve body. Another end of the water inlet connecting pipe is connected to a water supply angle valve through the first connecting member. Through the water inlet connecting pipe and the first connecting member, the faucet can be installed easily.

13 Claims, 7 Drawing Sheets

FAUCET STRUCTURE

BACKGROUND OF THE INVENTION

1. Field of the Invention

The present invention relates to a faucet, and more particularly to a faucet structure.

2. Description of the Prior Art

A faucet is generally used to control the flow of water, and its application involves various fields, such as agriculture, industry and domestic life.

The faucet sold on the market usually includes a faucet spout and a valve body. The water outlet end of the valve body is in communication with the faucet spout. When installing this type of faucet, the operator needs to purchase an additional water inlet connecting pipe for the water inlet end of the valve body to be connected to a water supply angle valve at the water supply end. This causes inconvenience to the installation of the faucet.

Accordingly, the inventor of the present invention has devoted himself based on his many years of practical experiences to solve these problems.

SUMMARY OF THE INVENTION

The primary object of the present invention is to provide a faucet structure that can be installed easily.

In order to achieve the above object, the present invention adopts the following solutions.

A faucet structure comprises a faucet spout, at least one valve body, at least one water inlet connecting pipe, and at least one first connecting member. A water outlet end of the valve body is in communication with the faucet spout. One end of the water inlet connecting pipe is hermetically connected to a water inlet end of the valve body. The first connecting member is installed at another end of the water inlet connecting pipe. The water inlet connecting pipe is hermetically connected to a water supply angle valve through the first connecting member.

Preferably, the first connecting member is a screw joint having an internal thread.

Preferably, the faucet structure further comprises a second connecting member. The water inlet connecting pipe is hermetically connected to the water inlet end of the valve body through the second connecting member.

Preferably, the faucet structure further comprises a pin member. A side wall of the valve body is formed with a pin hole communicating with the water inlet end. An outer wall of the second connecting member is formed with a pin groove. The second connecting member is inserted into the water inlet end of the valve body. One end of the pin member extends into the pin hole and then is inserted into the pin groove.

Preferably, a top of the second connecting member has a limiting surface. An inner wall of the water inlet end of the valve body has a limiting rib matching the limiting surface. When the limiting surface abuts against the limiting rib, the pin hole is aligned with the pin groove.

Preferably, the pin groove surrounds the outer wall of the second connecting member.

Preferably, the pin member includes two pin rods and a connecting rod. The two pin rods are connected by the connecting rod and inserted into the annular pin groove.

Preferably, the two pin rods and the connecting rod of the pin member are integrally formed and are U-shaped.

Preferably, the faucet structure further comprises a water outlet connecting pipe. One end of the water outlet connecting pipe is hermetically connected to the water outlet end of the valve body through a third connecting member. Another end of the water outlet connecting pipe is in communication with the faucet spout.

Preferably, the faucet structure further comprises an inserting rod. A side wall of the valve body is formed with an inserting rod hole communicating with the water outlet end of the valve body. An outer wall of the third connecting member is formed with a receiving groove. The third connecting member is inserted into the water outlet end of the valve body. One end of the inserting rod extends into the inserting rod hole and then is inserted into the receiving groove of the third connecting member.

Preferably, the faucet structure further comprises a communicating member. The communicating member includes two input ends and an output end that are in communication with an inner cavity of the communicating member. The output end of the communicating member is connected to the faucet spout through a main water outlet pipe. The at least one valve body includes two valve bodies. The water outlet ends of the two valve bodies are connected to the two input ends of the communicating member through two water outlet connecting pipes, respectively. Two ends of each water outlet connecting pipe are connected to the water outlet end of a corresponding one of the valve bodies and a corresponding one of the input ends of the communicating member, respectively.

Preferably, the input ends and the output end of the communicating member are respectively connected to the water outlet connecting pipes and the main water outlet pipe through a quick-release mechanism. The quick-release mechanism includes a hollow connector and a receiving seat. One end of the connector is formed with a plug-in tube mating with the receiving seat. A middle portion of the receiving seat is formed with a receiving hole mating with the plug-in tube of the connector. The receiving seat is provided with two opposite elastic buckles. The two elastic buckles can be moved towards each other or moved away from each other to release or hold the plug-in tube of the connector. Wherein, the receiving seat and the connector of the quick-release mechanism that connects each input end of the communicating member and the corresponding water outlet connecting pipe are connected to each input end of the communicating member and the corresponding water outlet connecting pipe, respectively. The receiving seat and the connector of the quick-release mechanism that connects the output end of the communicating member and the main water outlet connecting pipe are connected to the output end of the communicating member and the main water outlet connecting pipe, respectively.

Preferably, each elastic buckle has a holding arm with a C-shaped opening. An inner surface of the C-shaped opening of the holding arm is composed of a small arc surface with a smaller radius and a large arc surface with a larger radius. An outer wall of the plug-in tube of the connector is formed with an engaging groove. When the small arc surfaces of the two elastic buckles face each other to form a small hole, the holding arms of the two elastic buckles hold the plug-in tube of the connector tightly. When the large arc surfaces of the two elastic buckles face each other to form a large hole, the plug-in tube of the connector can enter and exit the receiving seat.

Preferably, an inner side of each elastic buckle is provided with an elastic piece. Two ends of the elastic piece respectively act on the elastic buckle and the receiving seat to give the elastic buckle an outward force.

Preferably, two sides of the receiving seat are formed with side grooves for accommodating the respective elastic buckles. Each elastic buckle further has a blocking wall corresponding in shape to an opening of a corresponding one of the side grooves. The elastic piece is disposed on an inner side of the blocking wall.

After adopting the above solutions, the invention is provided with the water inlet connecting pipe and the first connecting member. When the faucet is to be installed, the operator can first install the faucet of the present invention on a countertop. After that, the other end of the water inlet connecting pipe is directly hermetically installed on the water supply angle valve through the first connecting member, so that the installation of the faucet has the advantage of convenient installation.

In addition, the first connecting member of the present invention is a screw joint. When the faucet is to be installed, the operator can first install the faucet of the present invention on a countertop. After that, the other end of the water inlet connecting pipe is directly hermetically screwed to the water supply angle valve through the screw joint, so that the installation of the faucet has the advantage of convenient installation. In addition, the water inlet connecting pipe is hermetically screwed to the water supply angle valve through the screw joint, so that the connection between the water inlet connecting pipe and the water supply angle valve is firm and more stable.

In addition, the faucet structure further includes a pin member. The side wall of the valve body is formed with a pin hole communicating with the water inlet end. The outer wall of the second connecting member is formed with a pin groove. When installing, the second connecting member is inserted into the water inlet end of the valve body, and the pin hole is aligned with the pin groove, and the pin member is inserted through the pin hole of the valve body into the water inlet end of the valve body, and the pin member is inserted in the pin groove of the second connecting member to secure the second connecting member, such that the water inlet connecting pipe is hermetically connected to the water inlet end of the valve body through the second connecting member. The faucet structure of the present invention has the advantages of simple structure and convenient installation. In addition, in the installation process, there is no need to perform screwing and tightening operations, so as to prevent wear between the components. The connection strength is high, the sealing is good, and the water leakage can be avoided when high pressure water passes the faucet.

DETAILED DESCRIPTION OF THE PREFERRED EMBODIMENTS

Embodiments of the present invention will now be described, by way of example only, with reference to the accompanying drawings.

Figure 1:
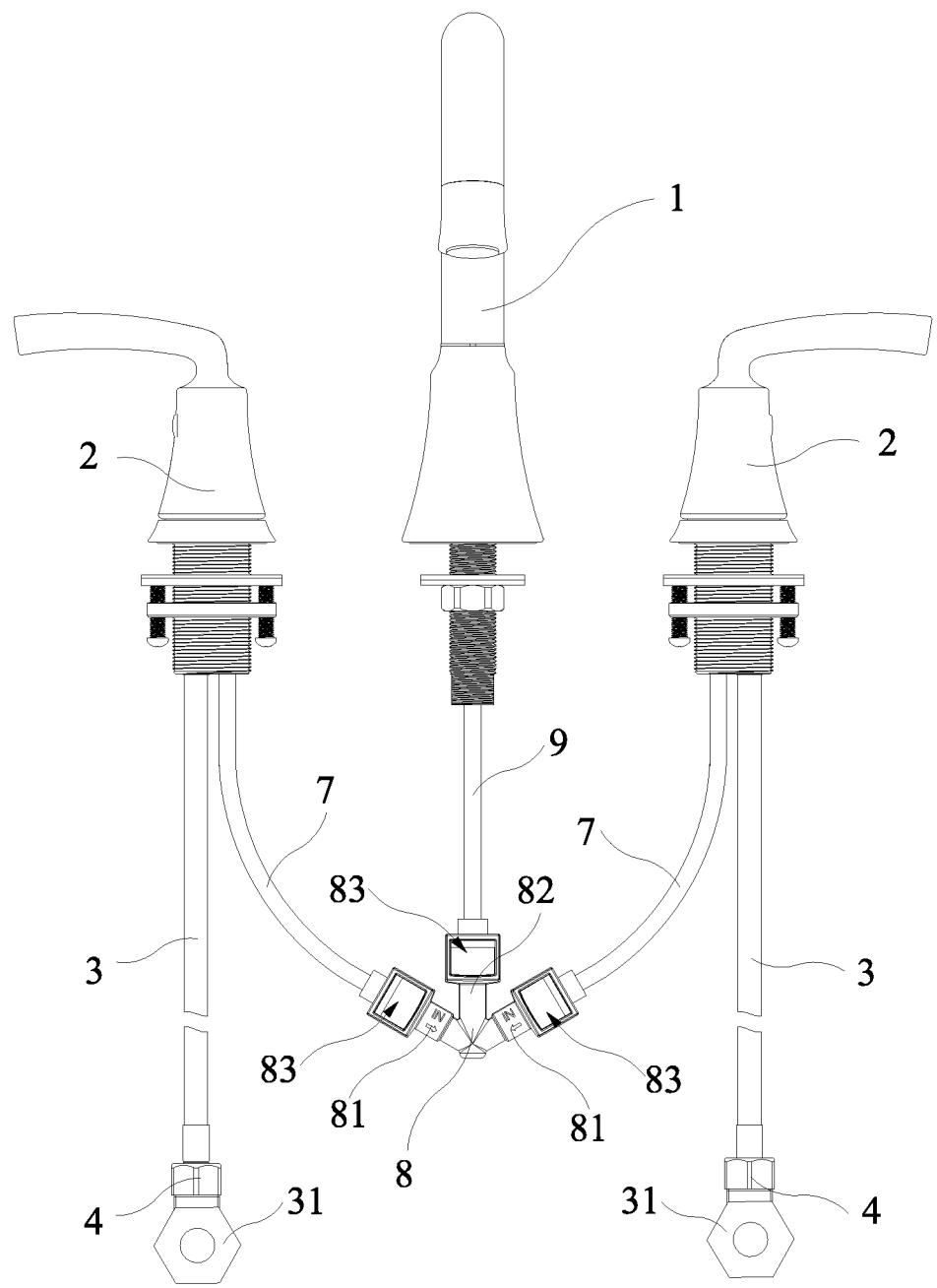
FIG. 1 is a schematic view according to a preferred embodiment of the present invention.
Figure 2:
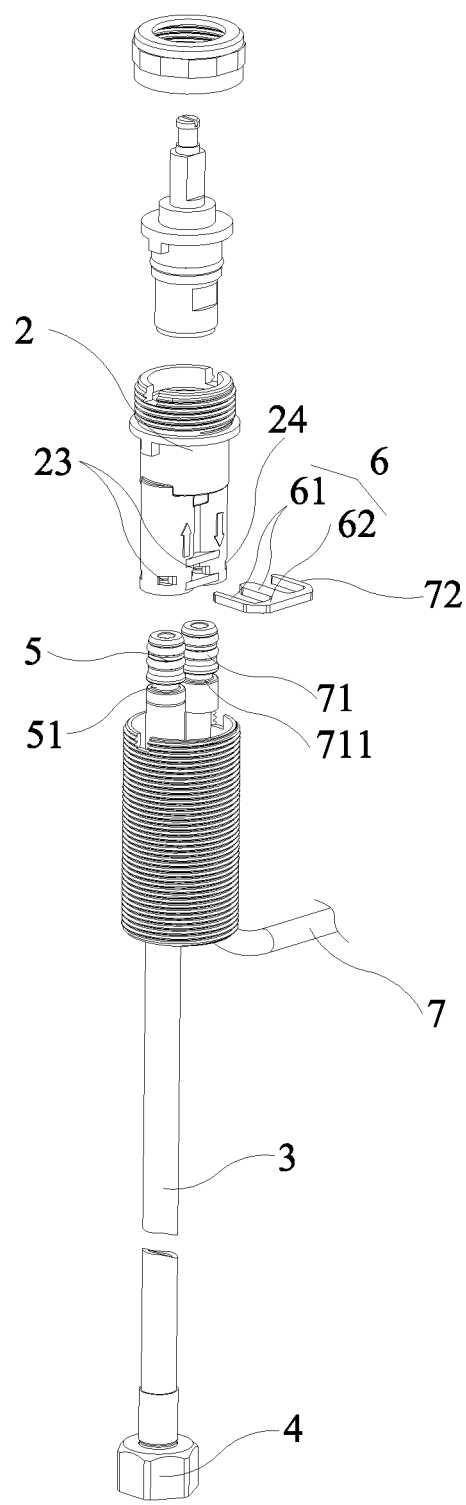
FIG. 2 is an exploded view of the valve body according to the preferred embodiment of the present invention.
Figure 3:
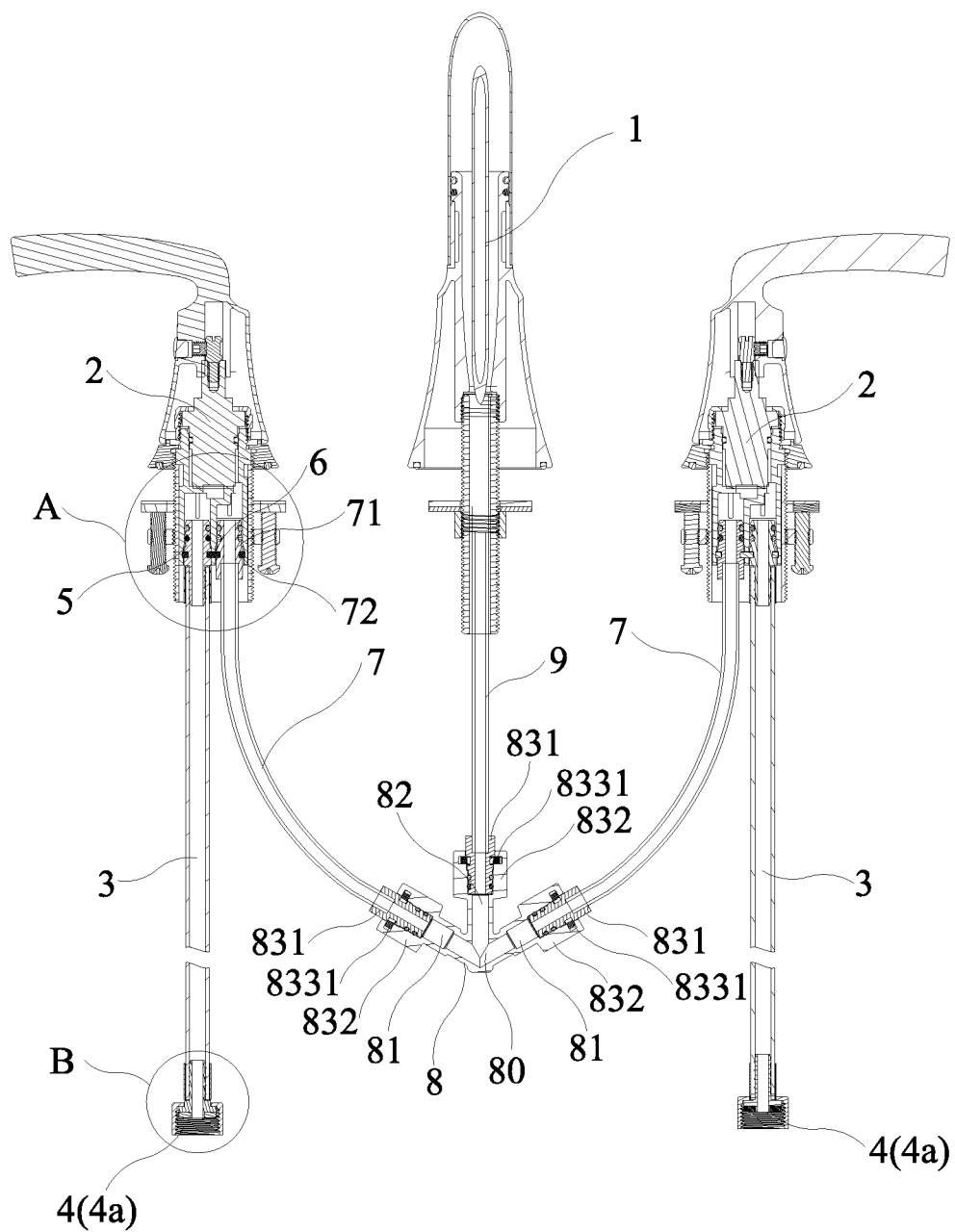
FIG. 3 is a cross-sectional view according to the preferred embodiment of the present invention.
Figure 4:
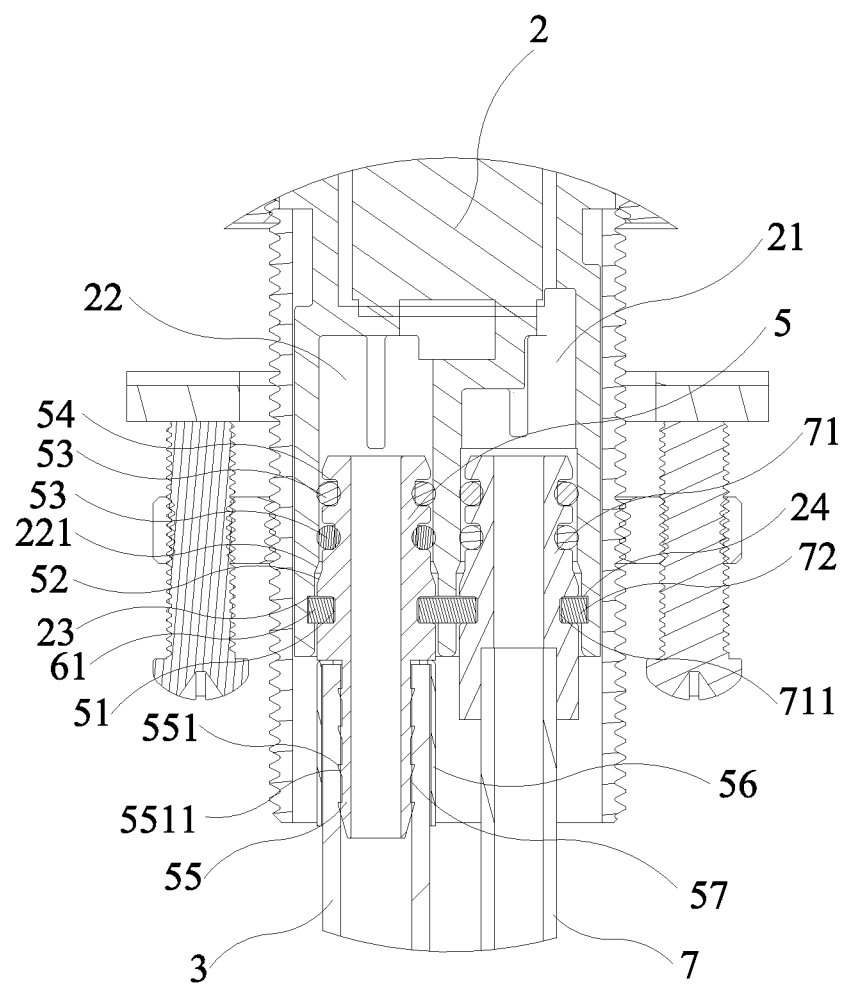
FIG. 4 is a partial enlarged view of circle A of FIG. 3.
Figure 5:
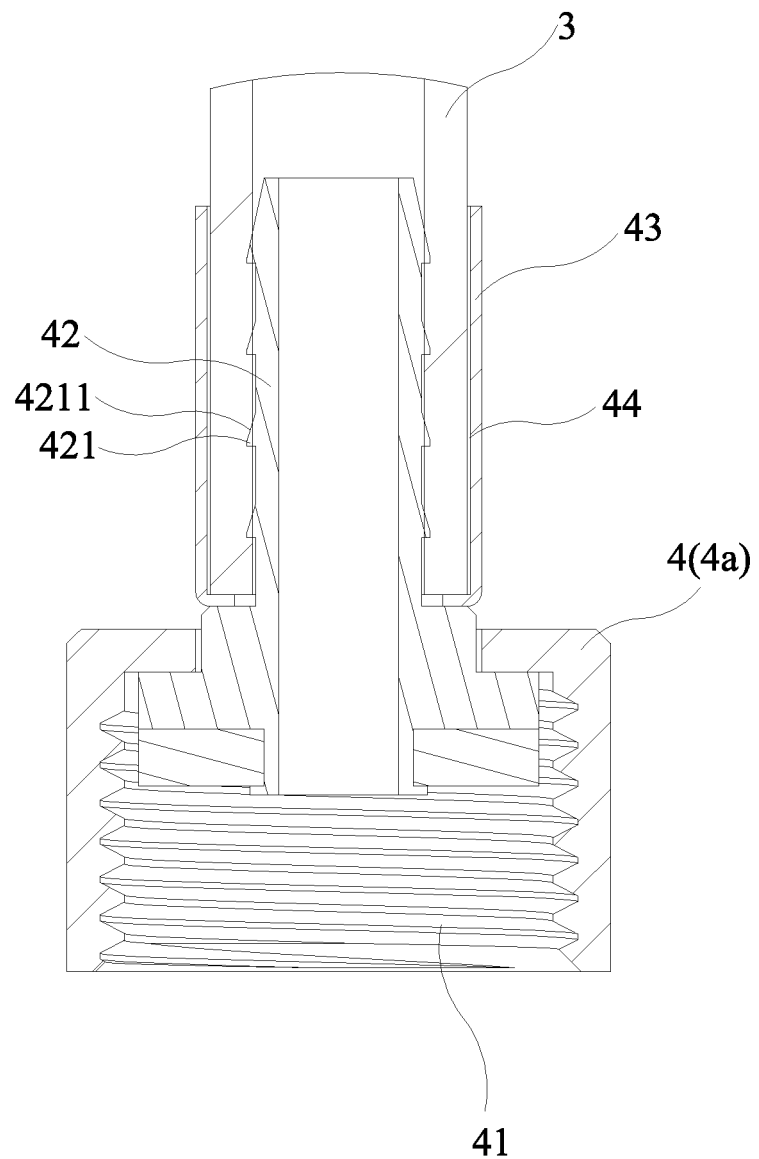
FIG. 5 is a partial enlarged view of circle B of FIG. 3.
Figure 6:
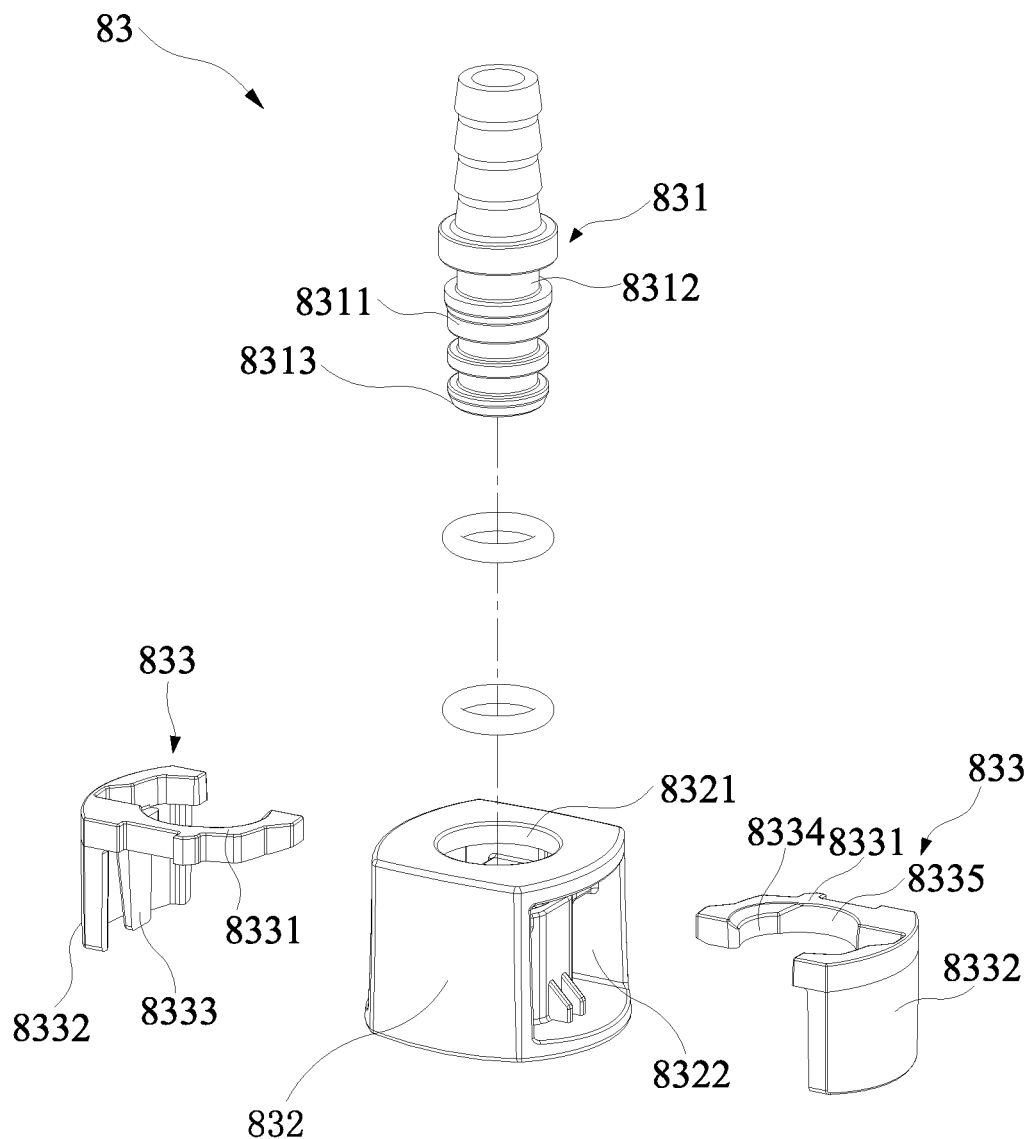
FIG. 6 is an exploded view of the quick-release mechanism according to the preferred embodiment of the present invention.
Figure 7:
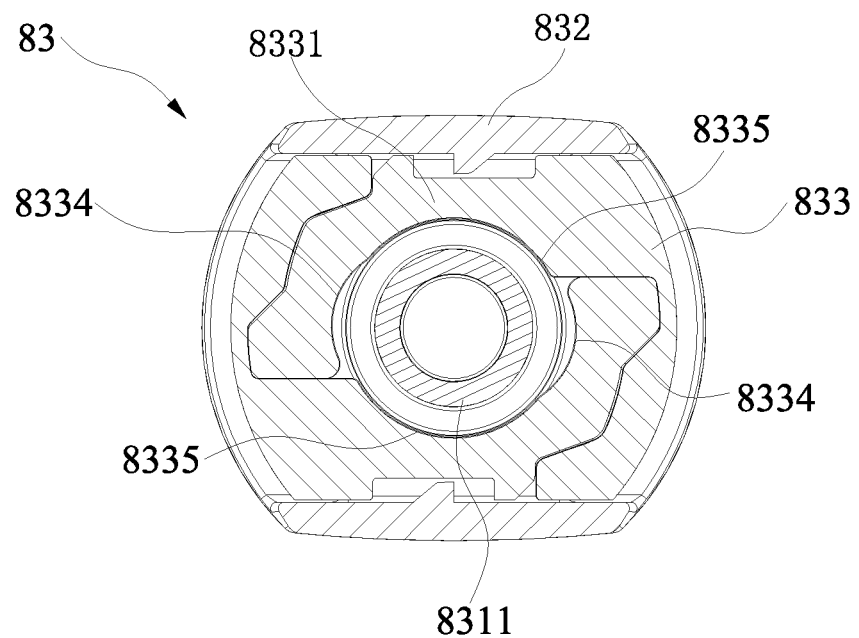
FIG. 7 is a cross-sectional view of the quick-release mechanism in an unlocked state according to the preferred embodiment of the present invention.
Figure 8:
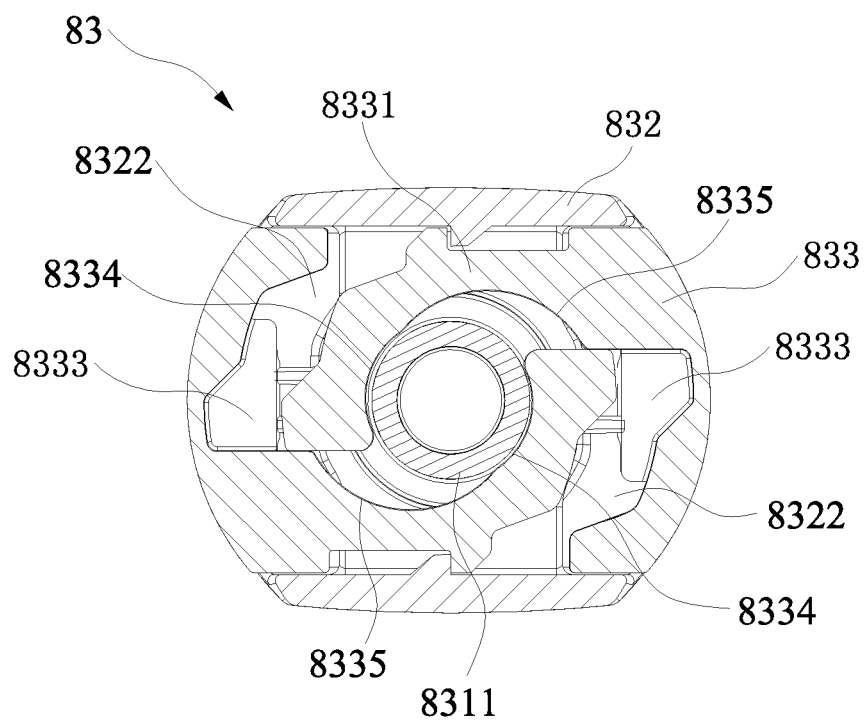
FIG. 8 is a cross-sectional view of the quick-release mechanism in a locked state according to the preferred embodiment of the present invention.

As shown in FIG. 1 through FIG. 8, a faucet structure according to a preferred embodiment of the present invention comprises a faucet spout 1, at least one valve body 2, at least one water inlet connecting pipe 3, and at least one first connecting member 4. One valve body 2, one water inlet connecting pipe 3 and one first connecting member 4 constitute a water inlet assembly. A water outlet end 21 of the valve body 2 is in communication with the faucet spout 1. One end of the water inlet connecting pipe 3 is hermetically connected to a water inlet end 22 of the valve body 2. The first connecting member 4 is installed at the other end of the water inlet connecting pipe 3. The water inlet connecting pipe 3 is hermetically connected to a water supply angle valve 31 through the first connecting member 4.

When the faucet is to be installed, the water inlet end 22 of the valve body 2 needs to be communicated with the water supply angle valve 31. The invention is provided with the water inlet connecting pipe 3 and the first connecting member 4. When the faucet is to be installed, the operator can first install the faucet of the present invention on a countertop. After that, the other end of the water inlet connecting pipe 3 is directly hermetically installed on the water supply angle valve 31 of the water supply end through the first connecting member 4, so that the installation of the faucet has the advantage of convenient installation. When in use, the valve body 2 is opened, and water flows from the water supply angle valve 31 of the water supply end to pass through the water inlet end 22 and the water outlet end 21 of the valve body 2 and then flow out from the faucet spout 1 for use.

In this embodiment, the first connecting member 4 is a screw joint 4a having an internal thread 41. When the faucet is to be installed, the water inlet end 22 of the valve body 2 needs to be communicated with the water supply angle valve 31. Therefore, in the present invention, the first connecting member 4 is a screw joint 4a. When the faucet is to be installed, the operator can first install the faucet of the present invention on a countertop. After that, the other end of the water inlet connecting pipe 3 is directly hermetically screwed to the water supply angle valve 31 through the screw joint 4a, so that the installation of the faucet has the advantage of convenient installation. In addition, the water inlet connecting pipe 3 is hermetically screwed to the water supply angle valve 31 through the screw joint 4a, so that the connection between the water inlet connecting pipe 3 and the water supply angle valve 31 is firm and more stable.

The first connecting member 4 has a first inserting portion 42. The first connecting member 4 is insertedly connected to the water inlet connecting pipe 3 through the first inserting portion 42. A first annular boss 421 is provided on the first inserting portion 42. The first annular boss 421 has a first inclined guide surface 4211 that extends downward and is inclined outwardly. When installing, the first inserting portion 42 can be easily and quickly inserted into the water inlet connecting pipe 3 through the first annular boss 421 having the first inclined guide surface 4211. Through the first annular boss 421, the first inserting portion 42 and the water inlet connecting pipe 3 realizes a sealed connection.

The first connecting member 4 is provided with a first limiting sleeve 43. The first limiting sleeve 43 is sleeved on the first inserting portion 42, and a first space 44 is defined between the first limiting sleeve 43 and the first inserting portion 42. When installing, the water inlet connecting pipe 3 is inserted into the first space 44 and sleeved onto the first inserting portion 42. The water inlet connecting pipe 3 is restricted by the first limiting sleeve 43, so the water inlet connecting pipe 3 can be firmly fitted in the first space 44 to prevent the water inlet connecting pipe 3 from loosening and falling off.

The faucet structure further includes a second connecting member 5. The water inlet connecting pipe 3 is hermetically connected to the water inlet end 22 of the valve body 2 through the second connecting member 5. When installing, the water inlet connecting pipe 3 can be hermetically connected to the water inlet end 22 of the valve body 2 through the second connecting member 5. There is no need for the operator to purchase installation accessories, which further facilitates the installation of the faucet.

The faucet structure further includes a pin member 6. The side wall of the valve body 2 is formed with a pin hole 23 communicating with the water inlet end 22. The outer wall of the second connecting member 5 is formed with a pin groove 51. One end of the pin member 6 extends into the pin hole 23 and then is inserted into the pin groove 51. When installing, the second connecting member 5 is inserted into the water inlet end 22 of the valve body 2, and the pin hole 23 is aligned with the pin groove 51, and the pin member 6 is inserted through the pin hole 23 of the valve body 2 into the water inlet end 22 of the valve body 2, and the pin member 6 is inserted in the pin groove 51 of the second connecting member 5 to secure the second connecting member 5, such that the water inlet connecting pipe 3 is hermetically connected to the water inlet end 22 of the valve body 2 through the second connecting member 5. The faucet structure of the present invention has the advantages of simple structure and convenient installation. In addition, in the installation process, there is no need to perform screwing and tightening operations, so as to prevent wear between the components. The connection strength is high, the sealing effect is good, and water leakage can be avoided when high pressure water passes through the valve body.

The top of the second connecting member 5 has a limiting surface 52. The inner wall of the water inlet end 22 of the valve body 2 has a limiting rib 221 matching the limiting surface 52. When the limiting surface 52 abuts against the limiting rib 221, the pin hole 23 is aligned with the pin groove 51, so that the pin member 6 can be directly inserted into the pin groove 51 after extending into the pin hole 23, thereby further making the present invention has the advantage of convenient installation. Because the second connecting member 5 is not only restricted by the limiting surface 52 and the limiting rib 221 but also locked by the pin member 6 and the pin groove 51, the second connecting member 5 can be firmly installed to the water inlet end 22 of the valve body 2, so that the connection between the water inlet connecting pipe 3 and the valve body 2 is firm and more stable.

The pin groove 51 surrounds the outer wall of the second connecting member 5. When installing, the operator can rotate the second connecting member 5 while inserting it into the water inlet end 22 of the valve body 2. Regardless of the rotation to any angle, as long as the second connecting member 5 is inserted into the predetermined position of the water inlet end 22, the pin hole 23 and the pin groove 51 are aligned with each other to allow the pin member 6 to be inserted, thereby further facilitating the installation of the present invention.

The pin member 6 includes two pin rods 61 and a connecting rod 62. The two pin rods 61 are connected by the connecting rod 62 and inserted into the annular pin groove 51. When installing, the two pin rods 61 are respectively inserted on both sides of the second connecting member 5 to lock the second connecting member 5, so that the installation of the second connecting member 5 is more firm and stable. In order to facilitate production and free installation, the two pin rods 61 and the connecting rod 62 of the pin member 6 are integrally formed and are U-shaped.

At least one sealing ring 53 is installed on the second connecting member 5. In this embodiment, two sealing rings 53 are installed on the second connecting member 5. By providing the sealing ring 53, the sealing performance between the second connecting member 5 and the water inlet end 22 of the valve body 2 is enhanced. In addition, the second connecting member 5 is provided with a mounting groove 54 for mounting the sealing ring 53. By providing the mounting groove 54, the sealing ring 53 can be positioned, so as to facilitate the installation of the sealing ring 53 and avoid the displacement of the sealing ring 53.

The second connecting member 5 has a second inserting portion 55. The second connecting member 5 is insertedly connected to the water inlet connecting pipe 3 through the second inserting portion 55. The water inlet connecting pipe 3 may be directly, insertedly connected to the second connecting member 5. A second annular boss 551 is provided on the second inserting portion 55. The second annular boss 551 has a second inclined guide surface 5511 that extends downward and is inclined outwardly. When installing, the second inserting portion 55 can be easily and quickly inserted into the water inlet connecting pipe 3 through the second annular boss 551 having the second inclined guide surface 5511. Through the second annular boss 551, the second inserting portion 55 and the water inlet connecting pipe 3 realizes a sealed connection.

The second connecting member 5 is provided with a second limiting sleeve 56. The second limiting sleeve 56 is sleeved on the second inserting portion 55, and a second space 57 is defined between the second limiting sleeve 56 and the second inserting portion 55. When installing, the water inlet connecting pipe 3 is inserted into the second space 57 and sleeved onto the second inserting portion 55. The water inlet connecting pipe 3 is restricted by the second limiting sleeve 56, so the water inlet connecting pipe 3 can be firmly fitted in the second space 57 to prevent the water inlet connecting pipe 3 from loosening and falling off.

The faucet structure further includes a water outlet connecting pipe 7. One end of the water outlet connecting pipe 7 is hermetically connected to the water outlet end 21 of the valve body 2 through a third connecting member 71, and the other end of the water outlet connecting pipe 7 is in communication with the faucet spout 1. The side wall of the valve body 2 is formed with an inserting rod hole 24 communicating with the water outlet end 21 of the valve body 2. The outer wall of the third connecting member 71 is formed with a receiving groove 711. The third connecting member 71 is inserted into the water outlet end 21 of the valve body 2. The faucet structure further includes an inserting rod 72. One end of the inserting rod 72 extends into the inserting rod hole 24 and then is inserted into the receiving groove 711 of the third connecting member 71, thereby connecting the third connecting member 71 with the water outlet end 21 of the valve body 2. The third connecting member 71 and the water outlet connecting pipe 7 can be connected in a sleeve manner. The inserting rod 72 may be integrally formed with the pin member 6. When installing, the second connecting member 5 and the third connecting member 71 are inserted into the water inlet end 22 and the water outlet end 21 of the valve body 2 respectively, and then the pin member 6 and the inserting rod 72 are respectively inserted through the pin hole 23 and the inserting rod hole 24 of the valve body 2 into the water inlet end 22 and the water outlet end 21 of the valve body 2. In addition, the pin member 6 and the inserting rod 72 are inserted into the pin groove 51 of the second connecting member 5 and the receiving groove 711 of the third connecting member 71, respectively.

In this embodiment, the faucet structure includes two valve bodies 2, that is, the number of valve bodies 2 is two. The water outlet ends 21 of the two valve bodies 2 are connected to the faucet spout 1, and the water inlet ends 22 of the two valve bodies 2 are respectively connected to the cold water supply angle valve and the hot water supply angle valve through the water inlet connecting pipes 3, thereby forming a two-handle faucet. The faucet structure further includes a communicating member 8. The communicating member 8 includes two input ends 81 and an output end 82 that are in communication with an inner cavity 80 of the communicating member 8. The output end 82 of the communicating member 8 is connected to the faucet spout 1 through a main water outlet pipe 9. The number of the valve bodies 2 is two. The water outlet ends 21 of the two valve bodies 2 are connected to the two input ends 81 of the communicating member 8 through the respective water outlet connecting pipes 7, respectively. Two ends of each water outlet connecting pipe 7 are connected to the water outlet end 21 of the valve body 2 and the input end 81 of the communicating member 8, respectively. Specifically, the input ends 81 and the output end 82 of the communicating member 8 are respectively connected to the water outlet connecting pipes 7 and the main water outlet pipe 9 through a quick-release mechanism 83 for quick disassembly and assembly. The quick-release mechanism 83 includes a hollow connector 831 and a receiving seat 832 communicating with the connector 831. The receiving seat 832 and the connector 831 of the quick-release mechanism 83 that connects the input end 81 of the communicating member 8 and the water outlet connecting pipe 7 are connected to the input end 81 of the communicating member 8 and the water outlet connecting pipe 7, respectively. The receiving seat 832 and the connector 831 of the quick-release mechanism 83 that connects the output end 82 of the communicating member 8 and the main water outlet connecting pipe 9 are connected to the output end 82 of the communicating member 8 and the main water outlet connecting pipe 9, respectively. One end of the connector 831 is formed with a plug-in tube 8311 mating with the receiving seat 832. The outer wall of the plug-in tube 8311 is formed with an engaging groove 8312. A middle portion of the receiving seat 832 is formed with a receiving hole 8321 mating with the plug-in tube 8311 of the connector 831. The receiving seat 832 is provided with two opposite elastic buckles 833. The two elastic buckles 833 can be moved towards each other or moved away from each other to release or hold the plug-in tube 8311 of the connector 83. Two sides of the receiving seat 832 are formed with side grooves 8322 for accommodating the respective elastic buckles 833. Each elastic buckle 833 has a holding arm 8331 with a C-shaped opening. The holding arm 8331 is fitted with the engaging groove 8312 of the plug-in tube 8311. Each elastic buckle 833 further has a blocking wall 8332 corresponding in shape to the opening of the side groove 8322. The inner side of the blocking wall 8332 is provided with an elastic piece 8333. Two ends of the elastic piece 8332 respectively act on the elastic buckle 833 and the receiving seat 832 to give the elastic buckle 833 an outward force. The inner surface of the C-shaped opening of the holding arm 8331 is composed of a small arc surface 8334 with a smaller radius in the front section and a large arc surface 8335 with a larger radius in the rear section. When the small arc surfaces 8334 of the two elastic buckles 833 face each other to form a small hole, the quick-release mechanism is in a locked state. At this time, the holding anus 8331 of the two elastic buckles 833 are engaged in the engaging groove 8312 on the outer wall of the plug-in tube 8311 to hold the plug-in tube 8311 tightly. When the large arc surfaces 8335 of the two elastic buckles 833 face each other to form a large hole, the quick-release mechanism is in an unlocked state. At this time, the holding arms 8331 of the two elastic buckles 833 release the plug-in tube 8311, and the connector 831 can freely enter and exit the receiving seat 832. The working principle of the quick-release mechanism of the present invention is described below. When the connector 831 is connected to the receiving seat 832, the plug-in tube 8311 of the connector 831 is inserted into the receiving seat 832 first. Under the action of the insertion force, the connector 831 pushes the small arc surfaces 8334 of the two elastic buckles 833 outwardly and drives the two elastic buckles 833 to move towards each other so that the large arc surfaces 8335 of the two elastic buckles 833 face each other to form a large hole. In this way, the plug-in tube 8311 of the connector 831 can be easily inserted into the receiving hole 8321 of the receiving seat 832. After being inserted in place, the two elastic buckles 833 move outwardly and return under the elastic force of the elastic pieces 8333, so that the small arc surfaces 8334 of the two elastic buckles 833 face each other to form a small hole, and the holding arms 8331 of the two elastic buckles 833 are tightly engaged in the engaging groove 8312 of the connector 831, so as to lock the connector 831. It is very convenient to assemble the connector 831 and the receiving seat 832. When it is necessary to disassemble the connector 831 and the receiving seat 832, the two elastic buckles 833 are pressed to move the two elastic buckles 833 towards each other, so that the large arc surfaces 8335 of the two elastic buckles 833 face each other to form a large hole. At this time, the connector 831 can be easily disengaged from the receiving seat 832. In order to facilitate the plug-in tube 8311 to push the small arc surfaces 8334 of the two elastic buckles 833, the end of the plug-in tube 8311 may be formed with a conical surface 8313.

It should be noted that the present invention is not limited to the provision of two valve bodies 2. It may be provided with one valve body 2. The water outlet end 21 of the valve body 2 is in communication with the faucet spout 1, and the water inlet end 22 of the valve body 2 is in communication with the water supply angle valve 31 through the water inlet connecting pipe 3 to form a single-handle faucet.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A faucet structure, comprising a faucet spout, at least one valve body, at least one water inlet connecting pipe, at least one first connecting member, a second connecting member, and a pin member; a water outlet end of the valve body being in communication with the faucet spout; one end of the water inlet connecting pipe being hermetically connected to a water inlet end of the valve body, the first connecting member being installed at another end of the water inlet connecting pipe; the water inlet connecting pipe being hermetically connected to a water supply angle valve through the first connecting member, wherein the water inlet connecting pipe is hermetically connected to the water inlet end of the valve body through the second connecting member; and wherein a side wall of the valve body is formed with a pin hole communicating with the water inlet end, an outer wall of the second connecting member being formed with a pin groove, the second connecting member being inserted into the water inlet end of the valve body, one end of the pin member extending into the pin hole and then being inserted into the pin groove.

2. The faucet structure as claimed in claim 1, wherein the first connecting member is a screw joint having an internal thread.

3. The faucet structure as claimed in claim 1, wherein a top of the second connecting member has a limiting surface, an inner wall of the water inlet end of the valve body has a limiting rib matching the limiting surface; when the limiting surface abuts against the limiting rib, the pin hole is aligned with the pin groove.

4. The faucet structure as claimed in claim 1, wherein the pin groove surrounds the outer wall of the second connecting member.

5. The faucet structure as claimed in claim 4, wherein the pin member includes two pin rods and a connecting rod, and the two pin rods are connected by the connecting rod and inserted into the annular pin groove.

6. The faucet structure as claimed in claim 5, wherein the two pin rods and the connecting rod of the pin member are integrally formed and are U-shaped.

7. The faucet structure as claimed in claim 1, further comprising a water outlet connecting pipe, one end of the water outlet connecting pipe is hermetically connected to the water outlet end of the valve body through a third connecting member, another end of the water outlet connecting pipe is in communication with the faucet spout.

8. The faucet structure as claimed in claim 7, further comprising an inserting rod, a side wall of the valve body being formed with an inserting rod hole communicating with the water outlet end of the valve body; an outer wall of the third connecting member being formed with a receiving groove, the third connecting member being inserted into the water outlet end of the valve body; one end of the inserting rod extending into the inserting rod hole and then being inserted into the receiving groove of the third connecting member.

9. The faucet structure as claimed in claim 1, further comprising a communicating member; the communicating member including two input ends and an output end that are in communication with an inner cavity of the communicating member; the output end of the communicating member being connected to the faucet spout through a main water outlet pipe;

the at least one valve body including two valve bodies; the water outlet ends of the two valve bodies being connected to the two input ends of the communicating member through two water outlet connecting pipes respectively, two ends of each water outlet connecting pipe being connected to the water outlet end of a corresponding one of the valve bodies and a corresponding one of the input ends of the communicating member, respectively.

10. The faucet structure as claimed in claim 9, wherein the input ends and the output end of the communicating member are respectively connected to the water outlet connecting pipes and the main water outlet pipe through a quick-release mechanism;

the quick-release mechanism includes a hollow connector and a receiving seat, one end of the connector is formed with a plug-in tube mating with the receiving seat, a middle portion of the receiving seat is formed with a receiving hole mating with the plug-in tube of the connector, the receiving seat is provided with two opposite elastic buckles, the two elastic buckles can be moved towards each other or moved away from each other to release or hold the plug-in tube of the connector;

wherein the receiving seat and the connector of the quick-release mechanism that connects each input end of the communicating member and the corresponding water outlet connecting pipe are connected to each input end of the communicating member and the corresponding water outlet connecting pipe, respectively; the receiving seat and the connector of the quick-release mechanism that connects the output end of the communicating member and the main water outlet connecting pipe are connected to the output end of the communicating member and the main water outlet connecting pipe, respectively.

11. The faucet structure as claimed in claim 10, wherein each elastic buckle has a holding arm with a C-shaped opening, an inner surface of the C-shaped opening of the holding arm is composed of a small arc surface with a smaller radius and a large arc surface with a larger radius;

an outer wall of the plug-in tube of the connector is formed with an engaging groove; when the small arc surfaces of the two elastic buckles face each other to form a small hole, the holding arms of the two elastic buckles hold the plug-in tube of the connector tightly; when the large arc surfaces of the two elastic buckles face each other to form a large hole, the plug-in tube of the connector can enter and exit the receiving seat.

12. The faucet structure as claimed in claim 10, wherein an inner side of each elastic buckle is provided with an elastic piece, and two ends of the elastic piece respectively act on the elastic buckle and the receiving seat to give the elastic buckle an outward force.

13. The faucet structure as claimed in claim 12, wherein two sides of the receiving seat are formed with side grooves for accommodating the respective elastic buckles; each elastic buckle further has a blocking wall corresponding in shape to an opening of a corresponding one of the side grooves, and the elastic piece is disposed on an inner side of the blocking wall.

* * * * *